United States Patent [19]

Lowery

[11] 4,194,781
[45] Mar. 25, 1980

[54] AUTOMATIC PACKING

[75] Inventor: Louie R. Lowery, Madison, N.J.

[73] Assignee: Keyes Fibre Company, Waterville, Me.

[21] Appl. No.: 846,194

[22] Filed: Oct. 27, 1977

Related U.S. Application Data

[62] Division of Ser. No. 719,846, Sep. 2, 1976.

[51] Int. Cl.² ............................................. B65G 59/02
[52] U.S. Cl. ..................................................... 294/61
[58] Field of Search ............. 294/61, 995, 106, 110 R; 214/8.5 R, 8.5 C, 8.5 D

[56] References Cited

U.S. PATENT DOCUMENTS

| 3,386,763 | 6/1968 | Ottaway et al. | 294/61 |
| 3,456,814 | 7/1969 | Bautz | 214/750 |
| 3,716,148 | 2/1973 | Varga | 294/61 |

Primary Examiner—James B. Marbert
Attorney, Agent, or Firm—Connolly and Hutz

[57] ABSTRACT

Packing spacer sheets are automatically fed one at a time to a pick-up station from a stack, with selected sheets arranged to arrive in inverted condition so that all packing sheets are properly oriented into packing position. Sheets can be pulled from stack by a transfer carrier having gripping jaws with teeth that dig into rib structures on sheet and jaws can open to engage other portions of sheet and thus hold the sheet to assure all teeth are pulled out of sheet. Stack can be a horizontal nesting of generally vertically disposed sheets carried by narrow spaced belts stepped along on a low friction surface with fixed retainer to stop forward face of stack and permit front sheet to be pulled off.

4 Claims, 8 Drawing Figures

AUTOMATIC PACKING

This is a division, of application Ser. No. 719,846 filed Sept. 2, 1976.

The present invention relates to packing, more particularly to the packing of fragile articles with protective packing spacers.

Among the objects of the present invention is the provision of novel apparatus for use in the foregoing packing.

The above as well as additional objects of the present invention will be more fully understood from the following description of several of its exemplifications, reference being made to the accompanying drawings wherein:

According to the present invention an automatic feed apparatus that supplies packing spacer sheets one at a time to a packing station, has a stack holder that holds a stack of spacer sheets with the end of the stack in a predetermined feed location, a transfer carrier shiftably mounted for movement between a first location adjacent said predetermined location for gripping the end spacer sheet and a second location where it drops the gripped spacer sheet, a chute under the second location to catch the dropped spacer sheet and slide it down forwardly to a pick-up station, and sheet inverting means connected to automatically invert a predetermined set of the spacer sheets so that they reach the pick-up station inverted side for side. The inverting means can include a first means for rotating the transfer carrier about half a revolution around an axis generally perpendicular to the sheet so that the rotated sheet drops into the chute rotated about 180° around a perpendicular axis, and additional means connected to flip the sheet over front-to-back as it moves down the chute.

A transfer carrier for gripping a molded fiber packing sheet having a raised rib structure, desirably has, according to the present invention, a set of jaws shaped to engage the rib structure, the jaws having gripping teeth that dig into the molded fiber of the rib structure when that structure is engaged by the ribs, and the jaws jointly float when in engaged position so that they readily compensate for the dimensional variations inherent in molded pulp products, and opening structure connected to open the jaws when a gripped sheet is to be released. The jaws can also carry release-assisting projections extending in the general direction in which the jaws open, to engage adjacent portions of the sheet when the jaws open and assure a positioning of the sheet that causes all the teeth to be pulled out of the molded fiber when the jaws are opened.

Another feature of the present invention is a stack holder that holds a generally horizontally extending stack of generally vertically disposed packing sheets, a low friction elongated supporting surface for the stack, a plurality of high friction belts each less than about ½ inch wide having an upper flight extending along said supporting surface and a lower flight below said surface, the belts being spaced from each other by at least two inches, advancing mechanizm connected to advance the belts and carry stacked packing sheets to one end of the supporting surface, and fixed restraining elements at that end for engaging the front of the stack by its edges, to keep the sheets from being pushed off that end by the advancing mechanism, but permitting the front sheet of the stack to be pulled off.

Figure 1:
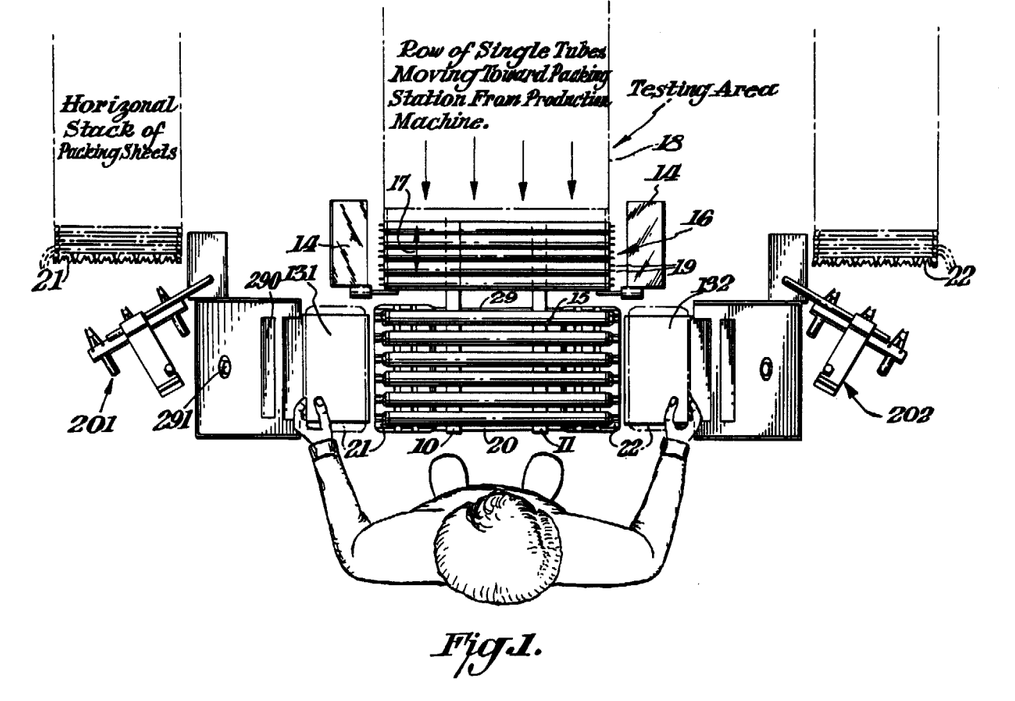
FIG. 1 is a schematic plan view of a general arrangement for packing straight fluorescent lamps pursuant to the present invention.

Turning now to the drawings, the overall sequence of packing operations involving the present invention is best seen in FIG. 1. A pair of arms 10, 11 is arranged to carry a set of six fluorescent lamps 15 spaced side by side in a horizontal row. For this purpose the arms 10, 11 have transverse grooves aligned so that each lamp rests in one of the grooves on each arm. The arms reciprocate together in the direction indicated by the double-ended arrow 17 so that they retract from the illustrated position to a loading position where they are below a series of the lamps at an inspection station 16 between inspecting mirrors 14, 14. An individual in charge of the packing can stand in front of the arms and use these mirrors to determine that the terminal pins 19 at both ends of each lamp are not bent and remove those lamps that have bent terminals. The lamps are rolled into station 16 from a test station where their terminal pins 19 are automatically engaged by electrical contacts that cause the lamps to light if they are not defective.

In the loading position the empty arms are elevated with their front ends inclined upwardly to engage and lift a set of the lamps in the appropriate grooves after the inspection is completed, and then the arms are moved to the illustrated position where they hold the lamps in an essentially horizontal row over a lowering platform 20. At about the same time a pair of packing sheets 21, 22 are moved from adjacent tables 131, 132 and placed over the sides of the platform under the respective ends of the lamps, an operation that is performed by hand. The arms 10, 11 are then lowered slightly to leave the set of lamps they hold now supported only by the packing sheets. At this point the arms are retracted to the loading position to receive a fresh set of the lamps.

Platform 20 is now lowered by an amount approximating the combined height of the lamps and their supporting sheets, another pair of packing sheets is placed over the ends of the lowered lamps, and a fresh set of lamps is deposited on them by arms 10, 11 in the same way the first set of lamps was deposited. The platform is again lowered and a third layer of lamps placed over a third pair of packing sheets, the steps being repeated until a desired number of lamp layers, such as six, is reached. Now a seventh pair of packing sheets is placed over the sixth layer of lamps and the six-layer assembly is ready for insertion into a carton.

The cartoning can be effected by sliding the lowered six-layer assembly endwise or backwards into open cartons held below the level of tables 131, 132. There is sufficient engagement between the lamps and the packing sheets to assure that the assembly slides into a carton without dislodging any of the sheets. Cartoning can also be accomplished by lifting the fully loaded platform to push the assembled layers of lamps on it up into the open end of an inverted open carton, after which the platform is pivoted around its far edge 29 to roll the inverted filled carton over into upright position so that its covers can be fastened to make it ready for shipment. The lamps so packaged are all cushioned at their ends by the spacers, there being one spacer above and one below each lamp end. Each spacer has ribs that partially encircle each lamp, the ribs of the last pair of spacers partially encircling the same lamps that are partially encircled by the ribs of the preceding pair.

Figure 2:
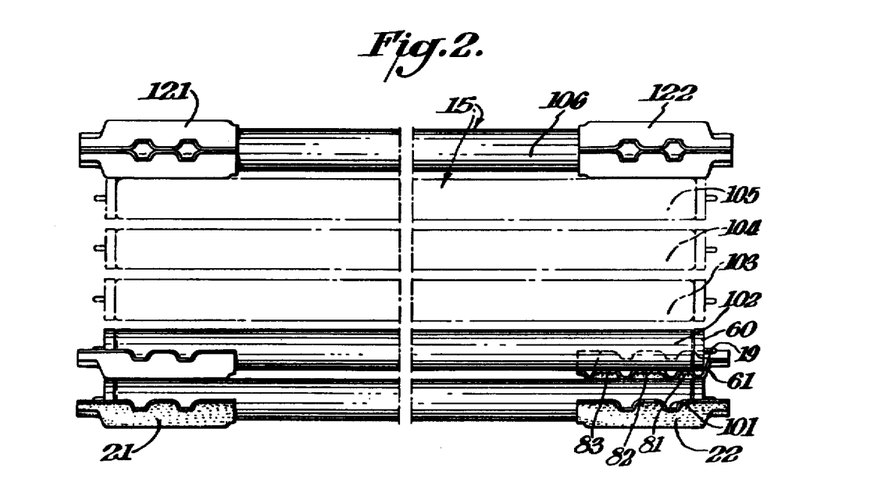
FIG. 2 is an enlarged front view of a detail of a packing feature in the packing arrangement of FIG. 1.
Figure 3:
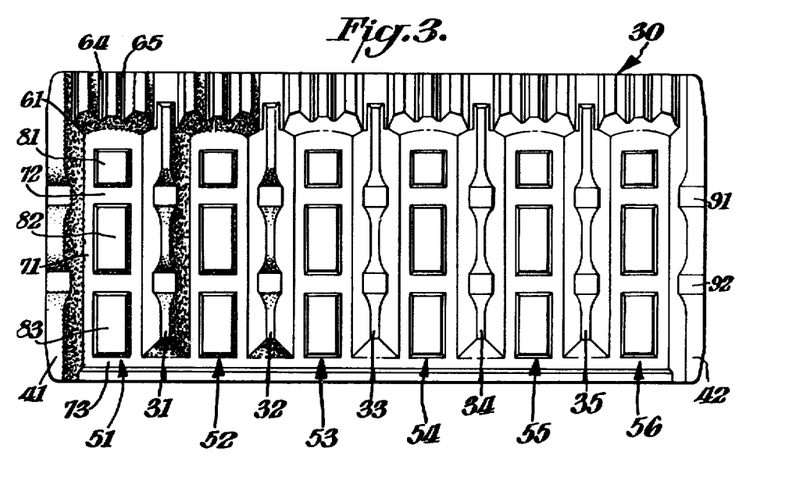
FIG. 3 is a plan view of a packing sheet used in the packing arrangement of FIGS. 1 and 2.

FIGS. 2 and 3 show this lamp packing more fully. The packing spacers are each identical and are shown in FIG. 3 at 30. They are molded from wood and/or paper pulp as generally rectangular sheets having a set of five transversely-extending parallel ribs 31, 32, 33, 34 and 35 standing up from its central portion, and upstanding walls 41, 42 that provide rib-like packing surfaces which increase to 7 the number of parallel rib-like surfaces. These form a set of six channels 51, 52, 53, 54, 55, 56 each of which receives one end of an elongated fluorescent light bulb 15.

Along one long edge, the sheet 30 is formed into a shoulder 61 merging into the successive rib structures to provide abutments that engage the end walls 60 of the fluorescent lamps but do not engage the terminal pins 19. Shoulder 61 is also shown as having transverse grooves 64, 65 receiving those terminal pins and protectively extending beyond them.

The floor of the sheet can be stiffened somewhat by depressions 71, 72, 73 distributed over it. These also provide short plateaus 81, 82, 83 that help cushion the bulbs. Additional bracing can be provided by notches 91, 92 molded in walls 41, 42 as well as in the ribs.

The ribs are shaped and spaced from each other to hold a fluorescent lamp cushioned so that less than half the lamp thickness rests in a channel 51, 52, etc. This leaves about half the lamp thickness exposed at each of the five lowest layers 101, 102, 103, 104, 105 of stacked lamps. The uppermost lamp layer 106 has the extra packing sheets 121, 122 inverted over its lamp ends and these cover the otherwise exposed half thickness.

By using the above packing technique it becomes unnecessary to devise a special packing sheet with ribs in its upper and lower surfaces, and a single type of standard packing sheet having all its ribs on one face does a very effective job. This also saves the extra packing height that would be required if the packing sheets had ribs on both their faces.

According to the present invention automatic feeders 201, 202 are arranged to automatically and successively place individual packing sheets on tables 131, 132 so that they can be conveniently moved by a packer into place on platform 20. These automatic feeders are shown as mirror images of each other and will now be described in detail in connection with FIGS. 4 through 8.

Each feeder has a rigid low-friction support plate 210 of steel for example, which holds a stack 212 of packing sheets all nested together. The stack is urged toward a stop frame 214 at one end of plate 210, by a set of belts 222 (FIGS. 6 and 7) each about ¼ inch wide and spaced about 2½ inches from each other. These belts need not be flat, and are shown as standard round rubber belts mounted on pulleys 224 adjacent stop frame 214 as well as on another set of such pulleys at the other end of the support plate. A slot can be cut out of the plate as at 226, to permit the pulleys 224 to be mounted under the plate with the belts running through the slot. The belts are all connected for simultaneous stepwise actuation to move their upper flights toward the stop frame, thus carrying along the stack of packing sheets. This stack is sufficiently light in weight that it does not cause the development of too much friction between the support plate and the stack-carrying belts. The belts themselves, or their upper surfaces, are of high-friction material such as rubber so that they very effectively carry and yieldably urge the packing sheets along toward the stop frame, but the stack-carrying belts slide easily over the low-friction support plate. Moreover, the intermittent belt movement produces less wear on the belts than continuous belt movement.

Stop frame 214 encircles the stack at the forward end of the support plate 210. The frame has uprights 230 and a top bar 232, all spaced from the stack, and a bottom bar 234 the top of which is about ⅛ inch above the support plate. The front of the stack is held above plate 210 by the belts on the belt pulleys and urged by the belts onto the top of the bottom bar 234.

A series of fingers 236 fitted to the uprights 230 and to the top and bottom bars 232, 234 extend toward the stack and help retain its leading packing sheet in place so that it does not fall off the forward end of the stack. These fingers each end about 1/16 inch in from the outer margins of the leading packing sheet, and can be pointed as shown to more readily permit that sheet to be deliberately pulled forward from the stack when desired. Heavy aligning guides 238 can also be used to make sure the individual packing sheets are properly aligned when they reach the forward end of the stack.

A transfer carrier 250 is arranged to grip and pull the leading packing sheet from within the stop frame. The carrier is shown as having a channel-shaped holding bracket 252 fitted with three sets of gripping jaws 261, 262, 263 and mounted by a tubular connector 254 in a journal bearing 257 in a generally vertically oriented plate 258. That plate in turn depends from a supporting arm 259 clamped to one end of generally horizontal swivel arm 268 the other end of which is bent downwardly and is pivotally received in a box 270.

The downwardly bent end projects out through the bottom of box 270, as shown at 272 (FIG. 7) where a crank arm 274 is clamped to it, the crank arm in turn being connected for rotation by a bar 276 operated by a hydraulic cylinder 278 secured to the lower portion of the base on which support plate 210 is held. Cylinder 278 is fitted with hydraulic lines 280, 282 by which the arm 268 is rotated to bring carrier 250 against the leading spacer sheet on the stack, or back to a sheet unloading position shown in FIG. 4.

The tubular connector 254 is arranged for rotation by a hydraulic cylinder 284 which raises and lowers a rack 286 having teeth meshing with a gear 288 fitted around the cylinder. This enables rotation of the holding bracket 252 180° and back around the axis of the tubular connector, between the position shown in FIGS. 5 and 6 to the upside-down position shown in FIG. 4.

Figure 4:
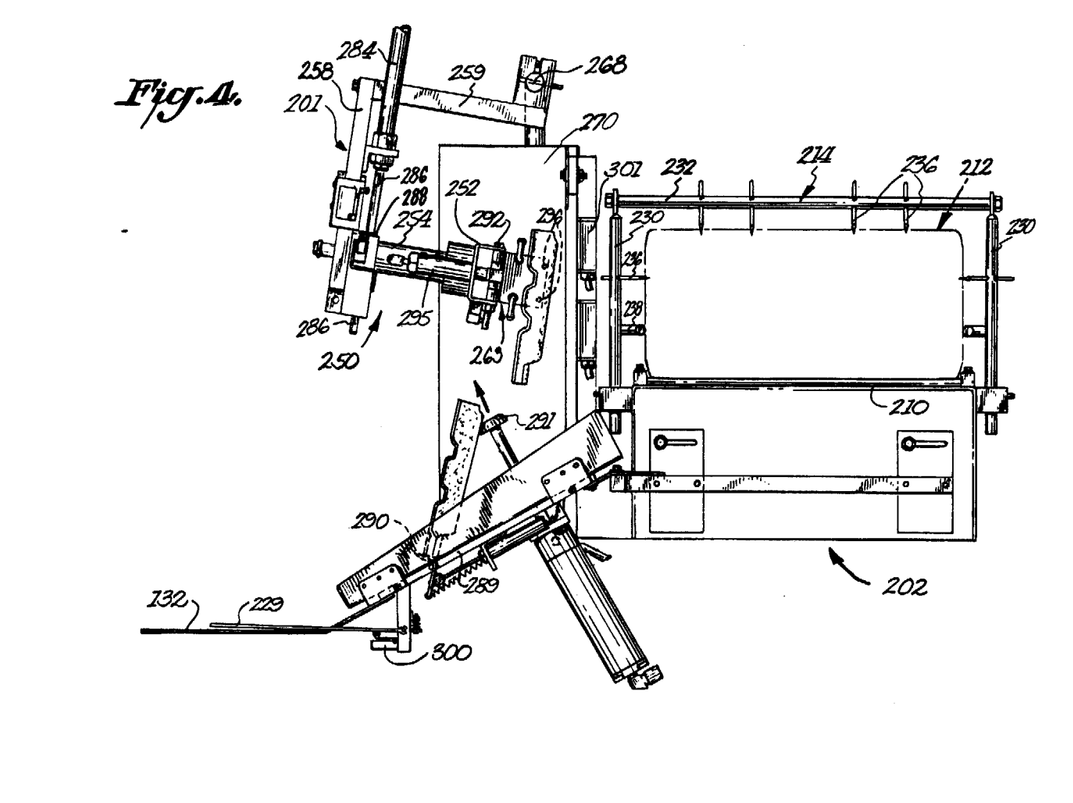
FIG. 4 is an elevational view of one of the automatic feed units for the arrangement of FIG. 1.

In the sheet unloading position illustrated in FIG. 4, the transfer carrier is over a discharge chute 289 fitted with a hydraulically operated retractable dam 290 and a hydraulically operated retractable push-rod 291. The chute leads down to table 132 where packing sheets are successively delivered by the transfer carrier.

Figure 5:
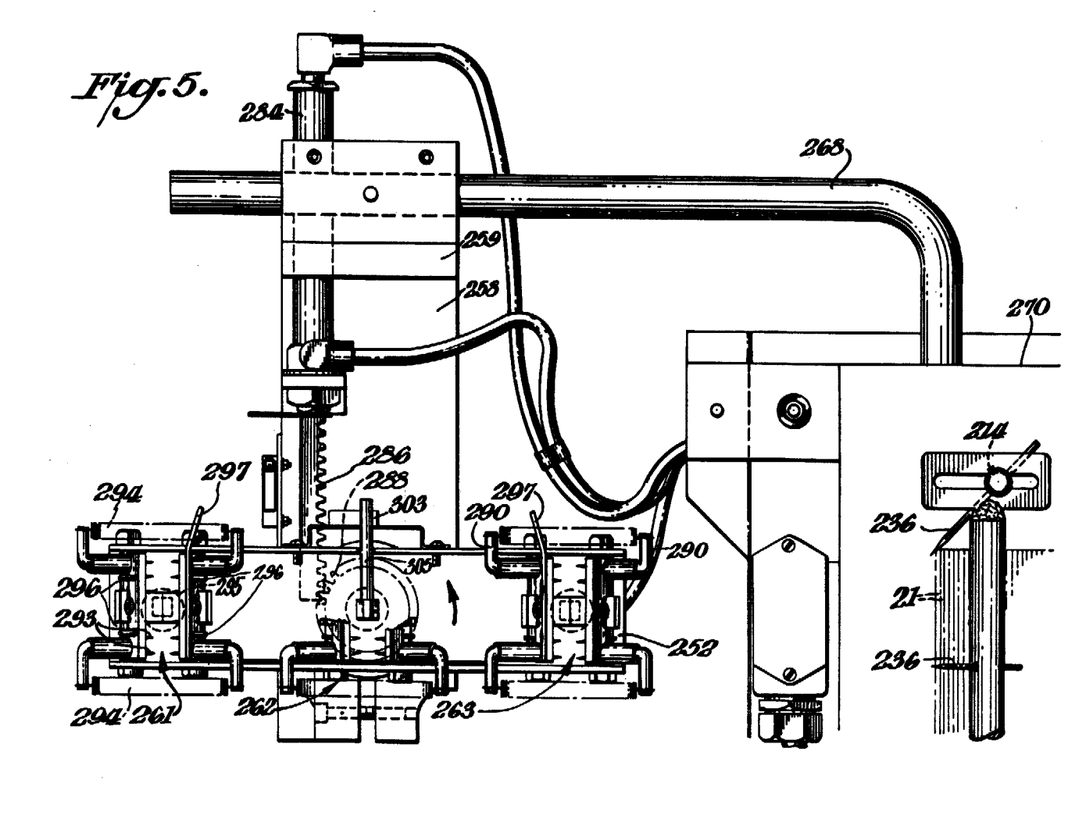
FIG. 5 is an enlarged view with parts broken away, looking at the face of the transfer conveyor of the apparatus of FIG. 4.
Figure 6:
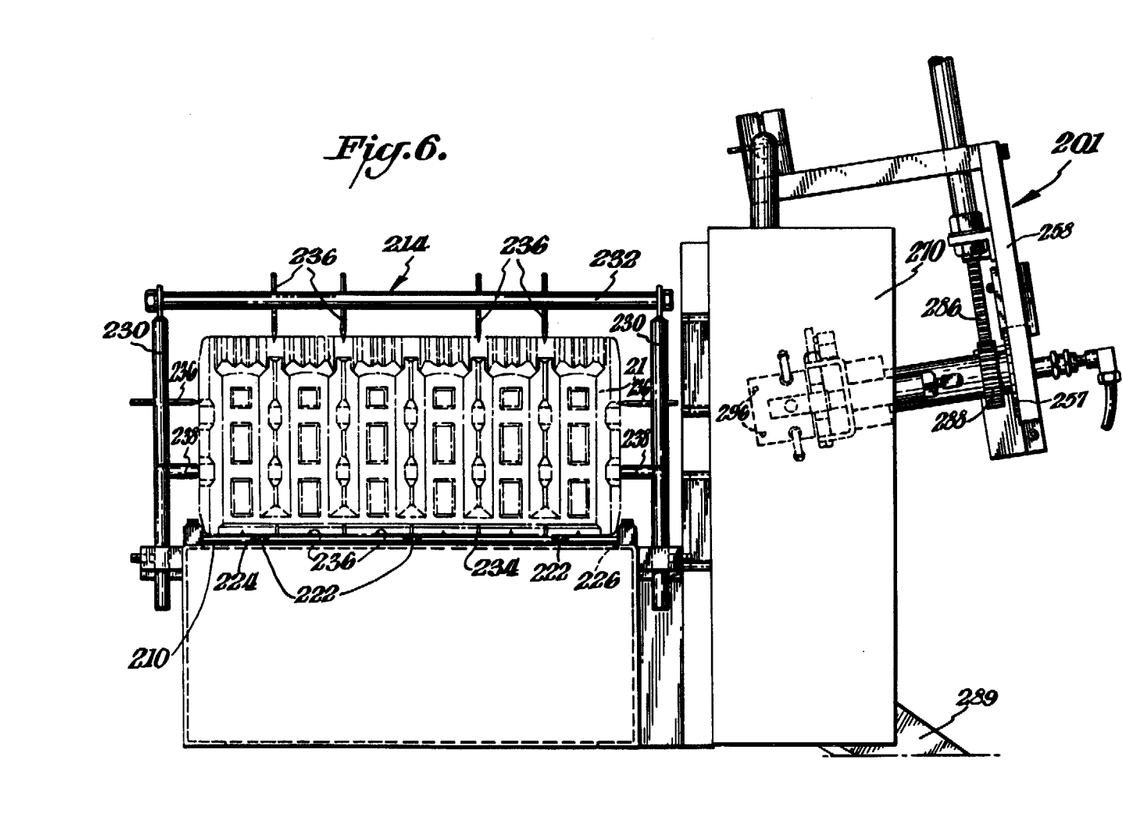
FIG. 6 is a more detailed elevational view similar to that of FIG. 4, showing portions of the second automatic feed unit looking at that unit from the rear.
Figure 7:
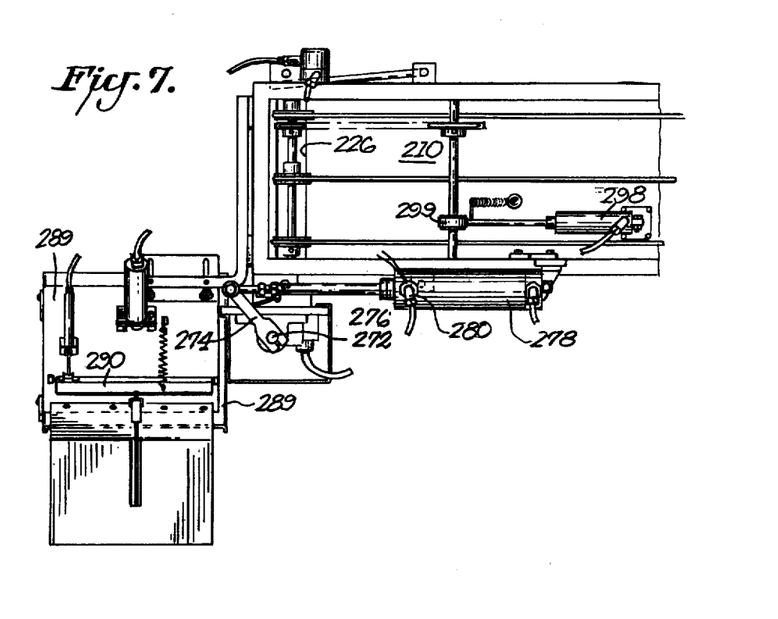
FIG. 7 is a bottom plan view of some of the operating mechanism for the construction of FIG. 4.
Figure 8:
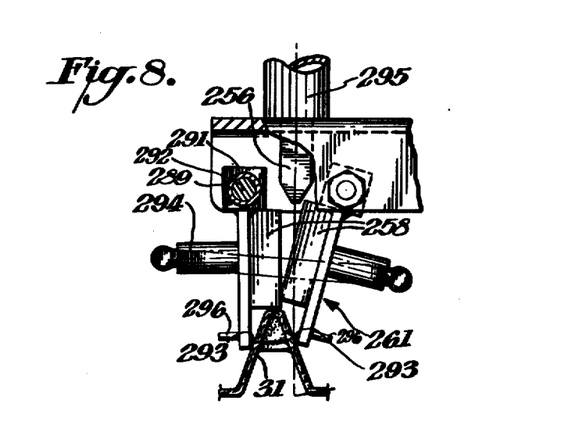
FIG. 8 is an enlarged detail of the sheet-gripping mechanism of the construction of FIG. 4 showing it gripping a warped portion of a sheet.

As shown more clearly in FIG. 5, the three sets of gripping jaws 261, 262 and 263 are pivoted to the holding bracket 252 as by bolts 292 that penetrate through openings in generally horizontal flanges on the carrier, and also penetrate through blocks 291 welded onto the rear of each jaw (FIG. 8). Spacers 289 can be slipped over each bolt above and below the block to hold the blocks at the proper level on the bolts. The mouths of every jaw are fitted with rows of needle-like teeth 293 that have lengths about equal to or somewhat longer than the wall thickness of a packing sheet. The teeth are also sufficiently narrow, about 1/32 inch thick at their widest portion, so they readily penetrate the wall of a packing sheet without damaging it.

The jaws of each pair are biased toward each other by engaging springs 294 hooked between ears 290 extending out laterally from each jaw, and are pushed apart by hydraulic cylinders 295 one of which is positioned inside the tubular mount 254. These cylinders have pistons rods 256 that engage cams 258 carried by each jaw where it faces its mating jaw, and movement of the piston rods toward the jaws causes the rods to engage and push the cams, thus pivoting the jaws outwardly around the bolts 292. This operation is more clearly shown in FIG. 8. As also shown in that figure the jaws are held in a jointly floating relation by their springs 294 and readily adjust themselves to properly engage a rib as at 31, even though the rib is not symmetrically spaced with respect to both jaw pivots. Molded pulp articles inherently tend to have substantial amounts of dimensional variation.

The mouths of the jaws are also shown as carrying on their outer faces sets of spacers 296 that assure the disengagement of the jaws from a packing sheet, although this feature is not essential. Also the jaws can be further fitted with guides 297 that engage the guide a packing sheet when it is released by the jaws, to assure that it falls free and its shoulder 61 does not get hung up on the top corners of those jaws. In the illustrated construction, those guides are only provided on the outer sets of jaws 261, 263, and only on the inner jaws of those two sets. It is preferred that the transfer carriage be tilted a few degrees, 8 to 10 for example, away from the exact vertical, as more clearly shown in FIGS. 4 and 6. This helps assure that the packing sheets drop onto the chutes 289 with the same face up.

An additional hydraulic cylinder 298 (FIG. 8) is also fitted to the lower portion of the base for support plate 210, and is connected to ratchet a one-way clutch 299 that drives a chain-and-sprocket assembly to rotate the forward pulleys 224 of the advancing belts 222.

All of the hydraulic cylinders are connected in parallel to a standard hydraulic pump and fluid return system containing electrically operated valves that separately effect cylinder actuation. A variable speed cycling switch is arranged to bring about the following sequence:

(a) rotation of the transfer carriage to a position against the leading packing sheet on the stack while the gripping jaws are held in opened position;

(b) release of the opened gripping jaws so they are moved by their actuating springs to engage the forwardly projecting walls of the ribs on that sheet. As noted above, the individual jaws are not in fixed orientation on the holder 252 but that any of the pairs of jaws can rotate a bit around their pivots to adapt to minor variations in the shape and location of the rib walls;

(c) rotation of the transfer carriage with the gripped sheet back to the sheet unloading position over chute 289 (FIG. 4);

(d) movement of the gripping jaws to their opened positions to release the gripped sheet. This release is made fool-proof by the spacers 296 which upon opening of the jaws engage the walls of the sheet adjacent to the rib wall in which the jaw teeth are inserted. By such engagement on jaw opening, the sheet is kept approximately centered with respect to the jaws so that it cannot be shifted any significant distance laterally on the teeth of the three left-hand jaws of each set, for example, as the jaws are opened. Such lateral sheet movement would permit the teeth of the right-hand jaws to disengage from the walls in which they were inserted, but could leave the teeth of all left-hand jaws still inserted in the sheet and thus keep the sheet from dropping onto the chute;

(e) actuation of belt advance by reciprocation of cylinder 298. This need not be a separate step and can be conducted during any of steps (b), (c) or (d);

(f) repetition of the foregoing sequence of steps except that every seventh sequence is modified by (I) conducting its step (c) so that rotation of the transfer carriage with a gripped sheet back to the sheet unloading position is accompanied by revolving of carriage holder 252 180° around the tubular connector 254 to rotate the gripped sheet side for side, (II) conducting its step (d) to open the gripping jaws while raising dam 290 so that it catches the unloaded sheet and holds it on the chute with the trailing portion of the sheet over the push-rod 291, (III) then reciprocating the push-rod to tilt the sheet thus positioned over the dam and invert it front-to-back as the sheet slides into position on table 132 in side-to-side inverted relation as compared to those arriving there in the preceding six sequences; and (IV) retracting dam 290, a step which is preferably effected while the transfer carriage goes through step (a) of the next sequence.

The seventh sequence carried out in the foregoing manner takes a little longer than any of the first six sequences because of the added time required to invert over the dam the sheet being delivered. The added time delay can be as little as a fraction of a second, and may be desired to help the packing operator recognize the seventh sequence so that he can correlate it with the completion of a stack of lamps. If such recognition is not desired, then the packing can be speeded up by speeding up steps (a), (b), (c) and/or (d) of the seventh sequence so that the seventh sequence requires the same or even less time than each of the first six.

The packing sheet delivery can also be synchronized with the packing as by providing an easily moved switch arm 299 over a portion of table 132 onto which a packing sheet lands when discharged from chute 289 and from which the sheet is moved when it is removed from the table, and connecting that arm so that it actuates a switch 300 that triggers the start of a feed sequence whenever a packing sheet is removed from the table. Such sequence triggering can cause a sequence to start at step (a), or at step (d). The latter arrangement is particularly desirable for maximum packing speed inasmuch as the apparatus can then be connected to automatically go through its sequencing at maximum speed, but automatically stopping at the completion of step (c). This makes a fresh packing sheet ready to immediately drop onto table 132 as soon as possible after the previous packing sheet is removed. The entire equipment is then automatically controlled by the packing individual without requiring him to go out of his way, or to set or reset timers or the like.

To effect such automatic synchronization, the actuation of the cylinders that open the gripping jaws is arranged to automatically close a switch 303 that actuates cylinder 278 to rotate the transfer carriage to the face of the stack. A pin 305 standing up from the piston rod 256 of one of the jaws can be conveniently used to operate switch 303. It is helpful to have such a switch incorporate a little delay in the actuation of the carriage rotation, to assure that the packing sheet released by the jaw opening has time to fall free of the carriage before the carriage rotation can deflect the fall away from chute 289.

A switch such as shown at 301 in FIG. 4 is actuated by the downwardly bent portion of swivel arm 268 when that arm is rotated enough to bring the carriage against the stack, and retracts the jaw cylinders to cause the jaws to be moved into gripping position by springs 294, to thus grip the leading sheet.

Completion of the retraction of the jaw cylinders then automatically actuates cylinder 287, as through switch 303, to return the transfer carriage to the sheet release position in which position the apparatus can remain until the previously released sheet is removed from table 132. Switch 300 tripped upon such removal can be self-resetting or can be reset by the arrival of the carriage at the stack.

Obviously many modifications and variations of the present invention are possible in the light of the above teachings. It is therefore to be understood that within the scope of the appended claims the invention may be practiced otherwise than as specifically described.

What is claimed:

1. In a transfer carrier for gripping a molded fiber packing sheet having a raised rib structure, a set of jaws shaped to engage the rib structure, the jaws having gripping teeth that dig into the molded fiber of the rib structure when that structure is engaged by the jaws, opening structure connected to open the jaws when a gripped sheet is to be released, the jaws carrying release-assisting projections extending in the general direction in which the jaws open, to engage adjacent portions of the sheet when the jaws open and assure a positioning of the sheet that causes all the teeth to be pulled out of the molded fiber when the jaws are opened.

2. The combination of claim 1 in which the sheets have a set of at least three parallel raised ribs and the carrier has pairs of jaws that engage the outer ribs of said set.

3. In a transfer carrier for gripping an article having a raised rib structure, a set of opposing independently pivoted jaws shaped to engage opposite sides of the rib structure, the jaws having gripping teeth that dig into the rib structure when that structure is engaged by the jaws, and the jaws being biased toward each other in jointly floating relation to allow for dimensional variations in the rib structure.

4. In the transfer carrier of claim 3 an opening structure to separate the jaws and release the rib structure engaged by the jaws, comprising a reciprocating piston capable of being extended into position against cams formed on a portion of the opposing faces of the jaws.

* * * * *